United States Patent [19]

Watarai

[11] Patent Number: 5,678,455

[45] Date of Patent: Oct. 21, 1997

[54] BAR-END SHIFTING DEVICE

[75] Inventor: Etsuyoshi Watarai, Sakai, Japan

[73] Assignee: Shimano, Inc., Osaka, Japan

[21] Appl. No.: 601,984

[22] Filed: Feb. 15, 1996

[51] Int. Cl.$^6$ ............... B60K 20/06; F16C 1/10; G05G 1/08

[52] U.S. Cl. ............... 74/475; 74/489; 74/502.2; 74/506; 116/28.1; D12/179

[58] Field of Search ............... D12/111, 179; D8/303; 74/475, 506, 502.2, 489; 474/78, 80, 81, 82, 127, 128; 116/28.1; 280/259, 288.4

[56] References Cited

U.S. PATENT DOCUMENTS

| | | |
|---|---|---|
| 3,633,437 | 1/1972 | Ishida ............... 74/489 |
| 4,900,291 | 2/1990 | Patterson ............... 474/80 |
| 5,134,897 | 8/1992 | Romano ............... 74/489 |
| 5,197,927 | 3/1993 | Patterson ............... 474/80 |
| 5,315,891 | 5/1994 | Tagawa ............... 74/489 |
| 5,476,019 | 12/1995 | Cheever et al. ............... 74/506 |
| 5,481,934 | 1/1996 | Tagawa ............... 74/475 |

FOREIGN PATENT DOCUMENTS 48-2600   1/1973   Japan.

*Primary Examiner*—Tamara L. Graysay
*Assistant Examiner*—Gary S. Hartmann
*Attorney, Agent, or Firm*—James A. Deland

[57] ABSTRACT

A shifting device includes a generally cylindrical main body part having a first end portion and a second end portion. An attachment part is fixed to the first end portion of the main body part, and the main body part includes an opening for receiving the cable therethrough. The attachment part may extend at a selected angle from the main body part for fixing the main body part to the free end of the handlebar. A winding member is disposed within the main body part, wherein the winding member has a winding surface for winding the shifter cable. A first end region of a connecting member is fixed to the winding member, and a partition member is disposed about the connecting member for positioning the connecting member within the main body part. An operating member is disposed at the second end portion of the main body part and is fixed to a second end region of the connecting member so that rotation of the operating member causes rotation of the winding member. A spring is provided for biasing the operating member in a particular direction. A first end of the spring is fixed to the partition member and a second end of the spring is fixed to the operating member.

20 Claims, 3 Drawing Sheets

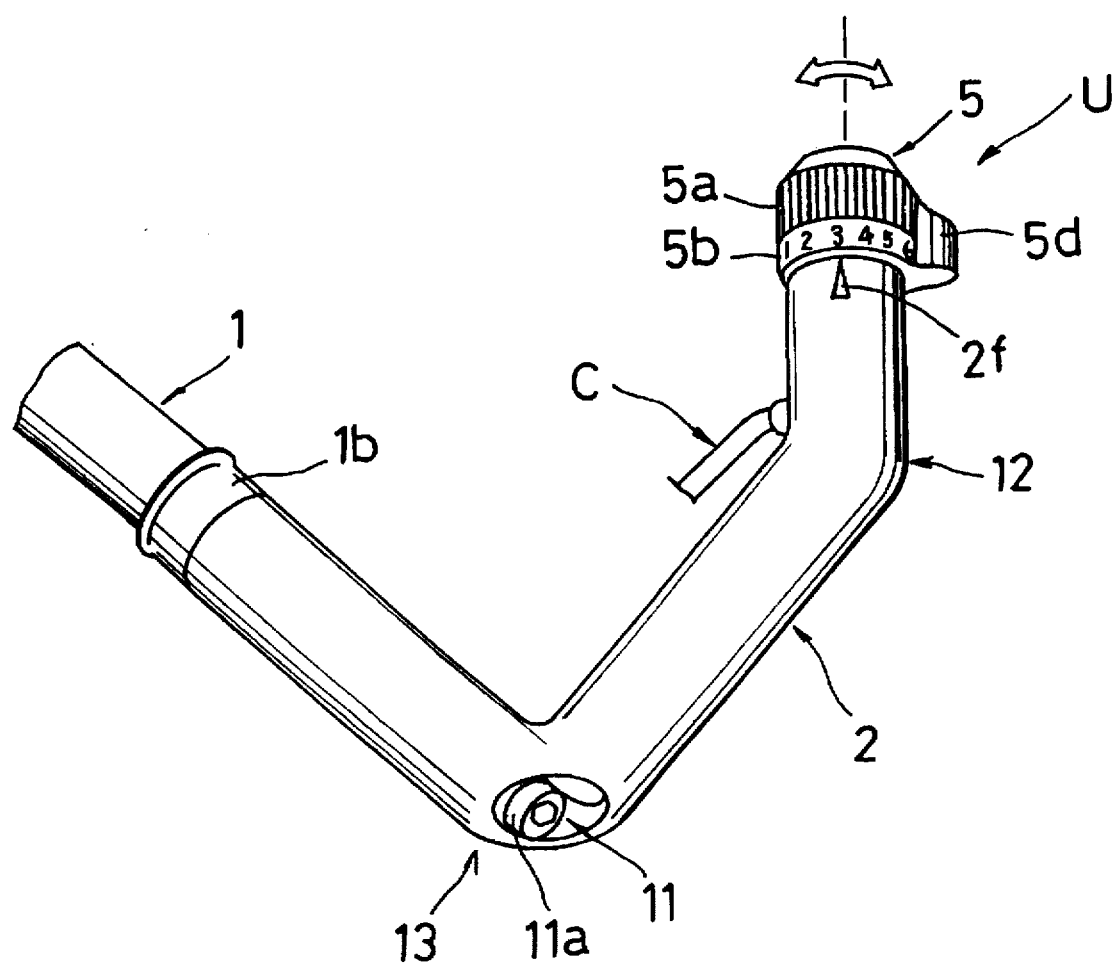

BAR-END SHIFTING DEVICE

BACKGROUND OF THE INVENTION

The present invention is directed to bicycle transmission shifting devices and, more specifically, to a shifting device which can be attached to a free end of a bicycle handlebar.

Devices which operate the front or rear derailleur of a bicycle have included so-called "twist-grip" shifter operating devices which are fit over the handlebar of the bicycle near the tip of the handlebar, and which operate the shifter cable by rotating concentrically with the shaft of the handlebar. Such twist-grip shifters which can be attached to the tip end of the handlebar are disclosed in Japanese Utility Model Application Kokoku No. 44-26571 and in U.S. Pat. Nos. 4,900,291.

There are two main types of twist-grip shifters. The first type has a take-up drum which is used to take up the shifter cable. The drum is disk-shaped and has a take-up groove formed around its circumference. The shifter disclosed in Japanese Utility Model Application Kokoku No. 44-26571 is of this type. With this type of shifter, the take-up dram and the connecting parts of the take-up drum are installed on the circumference of the handlebar together with the grip, thus forming a protruding object. When the handlebar tip to which the shifter is attached is bent in the forward direction, this protruding object may interfere with the operation of the system.

In the second type of grip type shifter, disclosed in U.S. Pat. No. 4,900,291, the shifter cable is passed along the handlebar, and the tip of the shifter cable is attached to a cam follower. A similar shifter is disclosed therein where the shifter cable is passed through the handlebar. In these types of systems, the cam follower moves along a cam as the grip is rotated so that the shifter cable is pulled. Unfortunately, the structure of the cam and cam follower is complicated compared to a case where a simple take-up drum is used. Thus, other problems arise, such as increased manufacturing costs, etc..

SUMMARY OF THE INVENTION

The present invention is directed to a twist-grip bicycle transmission shifting device wherein the components of the device may be located within a handlebar (including extensions thereof), and wherein the device employs simple cable pulling structures. The shifting device has a very compact structure, which makes it easy to grasp and use, and the parts may be manufactured very economically.

In one embodiment of the present invention, the shifter operating device comprises a winding member having a winding surface for winding the shifter cable, an elongated connecting member having a first end region and a second end region, and an operating member. If desired, the first end region of the connecting member may be fixed to the winding member generally perpendicular to a plane of the winding surface. A partition member is disposed about the connecting member for positioning the connecting member within the handlebar, and the operating member is fixed to the second end region of the connecting member so that rotation of the operating member causes rotation of the winding member.

If desired, the shifting device may take the form of a separate modular handlebar extension which can easily be affixed to an existing handlebar. In this case the shifting device comprises a generally cylindrical main body part having a first end portion and a second end portion. An attachment part is fixed to the first end portion of the main body part for attaching the main body part to a free end of the handlebar at a selected angle. The main body part includes an opening for receiving the cable therethrough. A winding member is disposed within the main body part, wherein the winding member has a winding surface for winding the shifter cable. A first end region of a connecting member is fixed to the winding member, and a partition member is disposed about the connecting member for positioning the connecting member within the main body part. An operating member is disposed at the second end portion of the main body part and is fixed to a second end region of the connecting member so that rotation of the operating member causes rotation of the winding member. If desired, a spring for biasing the operating member in a particular direction also may be used with the device. In this case the spring may have a first end fixed to the partition member and a second end fixed to the operating member.

BRIEF DESCRIPTION OF THE DRAWINGS

FIG. 4 is a perspective view of an alternative embodiment of a twist-grip shifting device according to the present invention.

DETAILED DESCRIPTION OF THE EMBODIMENTS

In the present specification, the terms "forward direction", "rearward direction", "lateral direction", "right direction" and "left direction" are respectively defined as directions with respect to the bicycle. Furthermore, the term "handlebar" includes portions of the handlebar which are integrally formed as well as attachments thereto.

Figure 1:
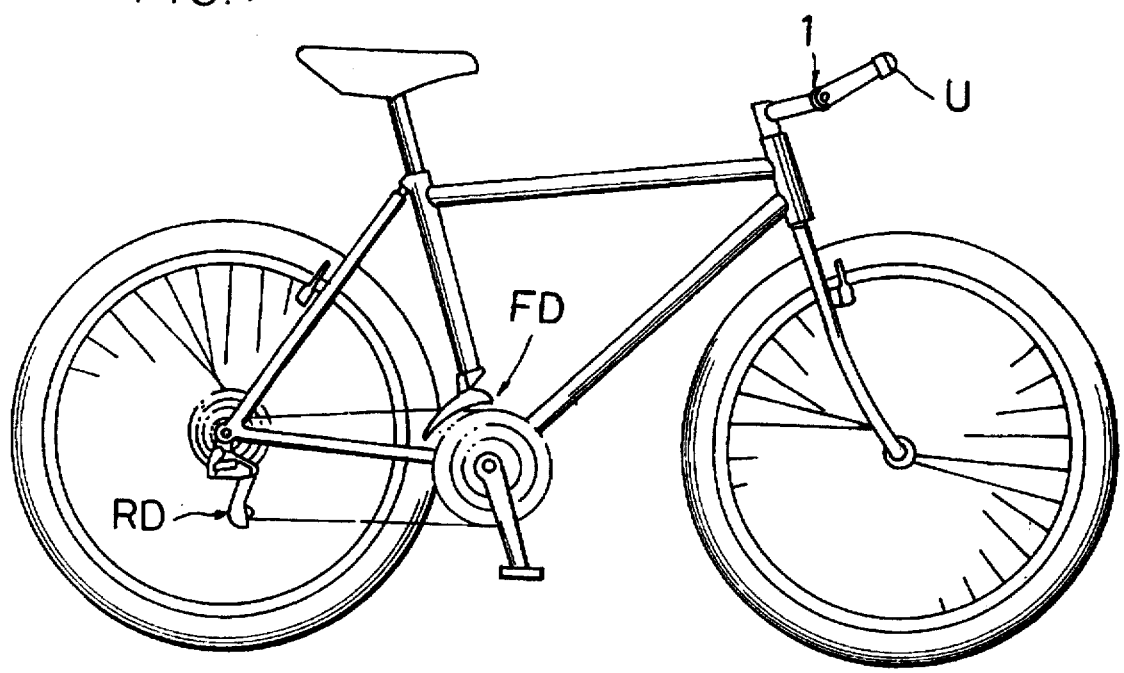
FIG. 1 is a side view of a bicycle which employs a particular embodiment of a twist-grip shifting device according to the present invention.

FIG. 1 shows a bicycle equipped with a particular embodiment of the present invention. This bicycle is equipped with a from derailleur FD and a rear derailleur RD. The front derailleur FD is operated by means of a shifter operating unit U which is installed on the right side of the handlebar 1, and the rear derailleur RD is operated by means of a shifter operating twit U which is installed on the left side of the handlebar 1.

Figure 2:
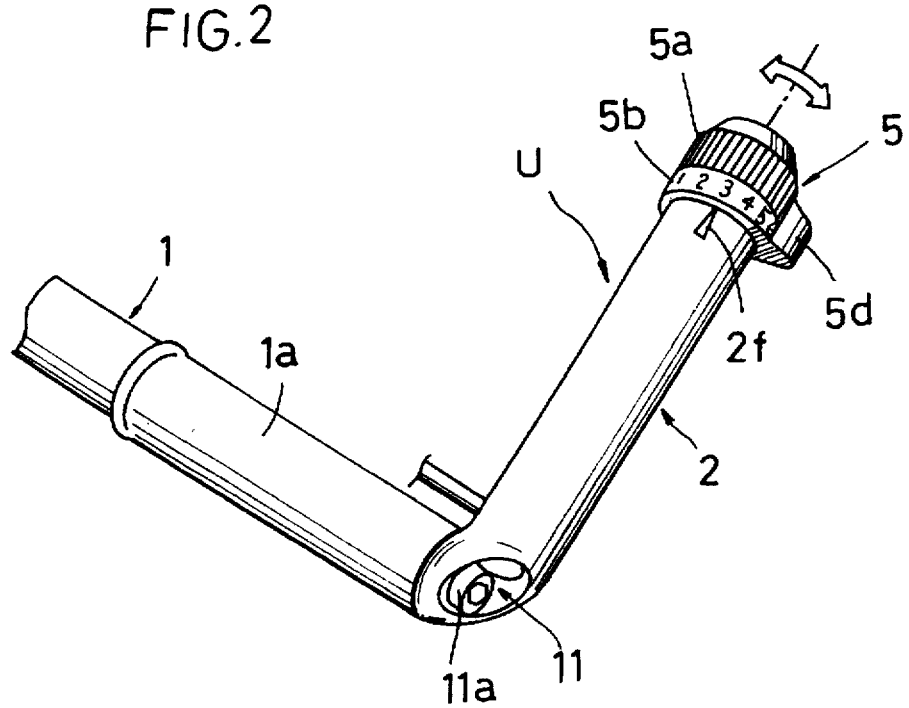
FIG. 2 is a perspective view of a particular embodiment of a twist-grip shifting device according to the present invention.

The handlebar of the bicycle shown in FIG. 1 is of the type that extends linearly in the lateral direction of the bicycle. Shifter operating units constructed according to the present invention which extend more or less straight forward are attached to the tips of said handlebar. As is shown in FIG. 2, an operating unit U is attached to the free end portion 1a of the handlebar 1 by an attachment means 11. The operating unit has a unit homing which consists of a main body part 2 and an attachment part 3. The main body part 2 is cylindrical in shape and has a first end portion (where the attachment part 3 is located) and a second end portion (on the other end). In the first end portion, the attachment part 3 extends from the main body part 2 at a right angle.

If desired, the main body part 2 and attachment part 3 may be manufactured as an integral unit from a material commonly used to make bicycle handlebars, such as an aluminum alloy or fiberglass, etc. However, from the standpoints of external appearance and light weight, the parts may also be manufactured from a reinforced plastic, etc.

Figure 3:
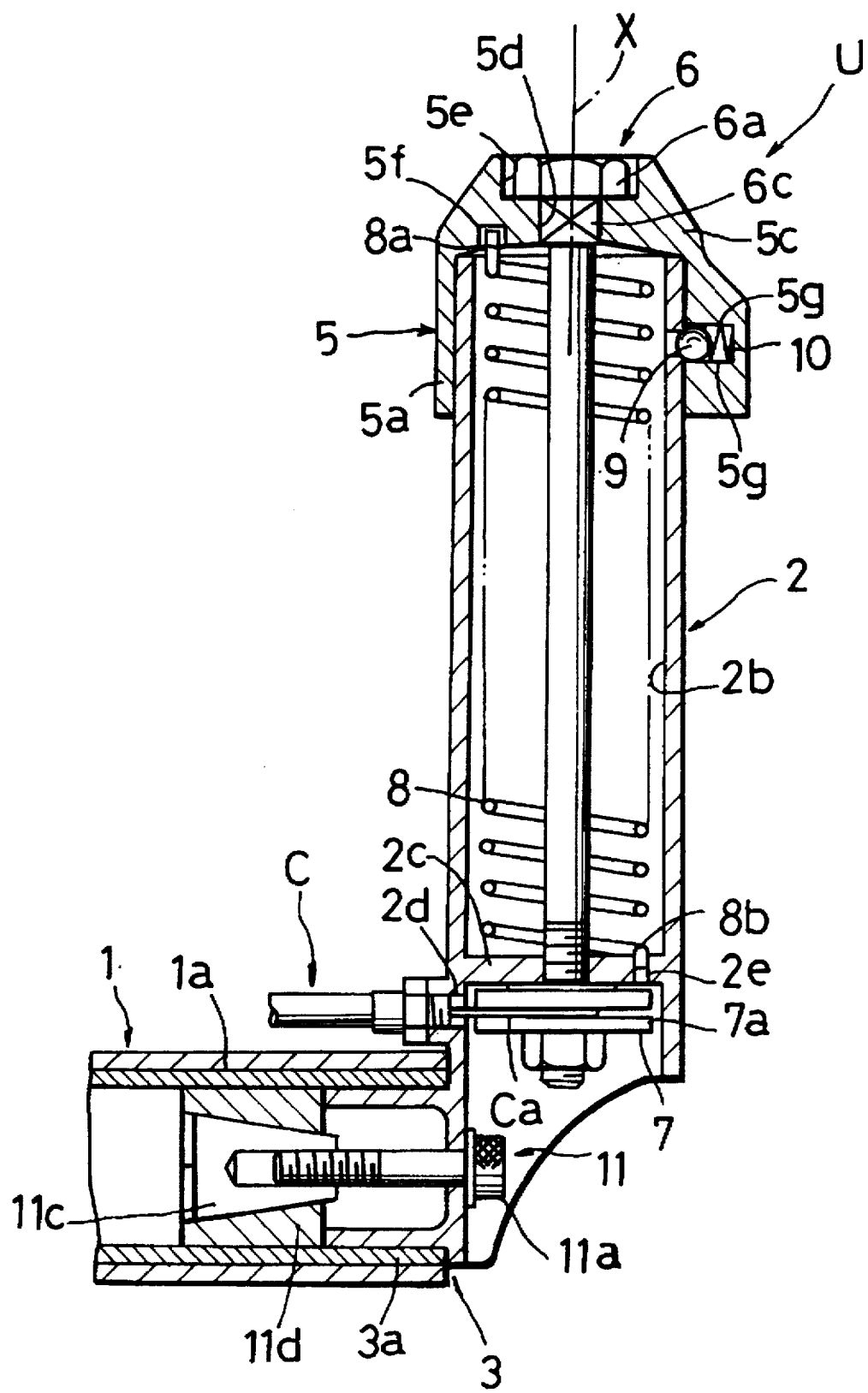
FIG. 3 is a cross sectional view of the twist grip shifting device shown in FIG. 2.

An operating part 5 which is used to perform shift operations is installed on the second end portion of the main body part 2. This operating part 5 is fit over the second end portion of the main body part 2 of the operating unit U and rotates about the axial center X of the main body part 2. As shown in FIG. 3, the operating part 5 is formed from a skirt part 5a which overlaps and envelops the second end portion of the main body part 2 from the outside, and a head part 5c which is arranged so that it covers the opening in the second end portion. Longitudinal grooves which are used to prevent slipping are formed in the outer surface of the skirt part 5a of the operating part 5. Since the skirt part overlaps the second end portion of the main body part 2, the system can be operated without any wobbling about the axis X.

A display part 5b is provided which displays numerals that indicate the respective speeds. An indicator needle 2f is displayed on the portion of the main body part 2 that is adjacent to the display part 5b, and the speed selected by the operating unit U is displayed by the joint action of the display part 5b and indicator needle 2f. Of course, instead of displaying numerals on the display part 5b, it would also be possible to display an indicator needle on the display part 5b, and to display numerals indicating the speed on the main body part 2. It is desirable that the operating part 5 be made of a material such as a plastic, polyethylene or robber, etc.

As is shown in FIG. 3, a hole 5d is formed in the central portion of the head part 5c of the operating part 5, and an attachment bolt 6 is passed through the hole 5d. A groove 5e whose depth is approximately the same as the thickness of the bolt head 6a of the attachment bolt 6 is formed in the head part 5c so that the bolt head 6a does not protrude from the operating part 5. An intermediate member 6c is installed between the attachment bolt 6 and the operating part 5 so that the two parts rotate as a unit.

A cylindrical space is formed inside the main body part 2 by the inside surface 2b of the main body part 2. The attachment bolt 6 extends through this space along the axis X toward the first end portion of the main body part 2, passes through a hole formed in the center of a partition wall 2e which is installed inside the main body part 2, and is screwed into a take-up drum 7. Accordingly, the take-up drum 7 is positioned inside a space formed by the partition wall 2c and inside surface 2b, and it is supported by the partition wall 2c (which may or may not be integrally formed with main body part 2) so that the take-up drum 7 can rotate relative to the main body part 2.

The take-up drum 7 has an overall disk shape, and a take-up groove 7a which is used to take up the inner cable Ca of the shifter cable C is formed in the circumferential surface of the take-up drum 7. The inner cable Ca, which is connected to the front derailleur FD or rear derailleur RD, passes through a through-hole 2d which is formed in the vicinity of the first end portion of the main body part 2 and is taken up on the take-up drum 7.

The attachment part 3 may be formed as a cylindrical part 3a which extends at a right angle from the first end portion of the main body part. This cylindrical part 3a has a cylindrical outer surface which contacts the inside surface of the tip of the handlebar 1. The shifter operating unit thus may be attached by means of the friction between this outer surface and the inside surface of the handlebar. By using frictional engagement to attach the main body part to the handlebar, there is no need to cut threads in the handlebar or attachment part. However, in this embodiment is desirable that the following specific type of frictional attachment means 11 may be provided.

Specifically, in this embodiment a bolt 11a passes through a hole formed in the main body part, and extends toward the handlebar concentrically with the cylindrical part 3a. The tip of this bolt 11a is screwed into a first wedge member 11c. This first wedge member 11c contacts a plurality of second wedge members 11d. The second wedge members 11d are connected by a nylon wire, etc., so that the second wedge members 11d can move relative to the first wedge member 11c. The first wedge member 11c has wedge surfaces which widen toward the tip. Thus, when the bolt 11a is tightened, the outer circumferential surfaces of the second wedge members 11d are pressed against the inside surface of the handlebar by the sliding movement of the first wedge member 11c with the inclined surfaces of the second wedge members 11d. In this manner a frictional engagement is created. In this embodiment, the tips of the second wedge members 11d on the side of the cylindrical part 3a contact the end portion of the cylindrical part 3a, so that the second wedge members 11d are prevented from entering the interior of the cylindrical part 3a.

A driving spring 8 which is used to compensate for the tension of the inner cable Ca in a known manner is installed inside the interior space of the main body part 2. A first spring leg 8a is inserted into a hole 5f formed in the inside surface of the head part 5c of the operating part 5, while a second spring leg 8b is inserted into a hole 2e formed in the partition wall 2c of the main body part 2, so that the take-up drum 7 is biased in the take-up direction. The positioning means which is used to fix the operating part 5 at the selected speed is formed by a ball 9 and a driving spring 10 installed inside a space 5g formed in the inside of a bulging part 5c of the operating part 5. Spring 10 drives the ball toward the main body part 2 for engaging one of a plurality of holes formed in the second end portion of the main body part in positions corresponding to the respective speeds.

While the above is a description of various embodiments of the present invention, further modifications may be employed without departing from the spirit and scope of the present invention. For example, in the embodiment described above the attachment part 3 was attached to the main body part 2 at a right angle with respect to the direction of length of the main body part 2. However, this angle of attachment could also be an acute angle or an obtuse angle. Accordingly, the shifter operating unit of the present invention can be attached not only to handlebars which extend in the lateral direction, but also to handlebars which extend in directions other than the lateral direction, or to extension parts attached to handlebars.

Furthermore, in the embodiment described above the unit housing was constructed from a straight main body part 2 and an attachment part 3 which extended at a right angle from the main body part 2. Of course, the shape of the unit housing of the present invention is not limited to such a shape. For example, it would also be possible to use a shape such as that shown in FIG. 4. In FIG. 4, the tip of the handlebar 1 of the bicycle is in the position indicated by 1b, the part extending further toward the tip from this position is the unit housing, and the operating part 5 is installed at the very tip of this unit housing. This unit housing is bent at a first bent part 12 and a second bent part 13. The take-up drum is installed inside the unit housing on the operating part side of the first bent part, and the shifter cable C is led out of the unit housing near this point In the embodiment described above, the cylindrical part 3a of the attachment part 3 could have a cylindrical outer surface that engaged with the inside surface of the handlebar 1. However, it would also be possible to form splines in this outer surface and the corresponding inside surface of the handlebar 1 so that relative rotation is prevented.

Thus, the scope of the invention should not be limited by the specific structures disclosed. Instead,. the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle shifter operating device for attachment to a free end of a bicycle handlebar (1) to shift a bicycle transmission with a shifter cable (Ca), the shifter operating device comprising:

a winding member (7) having a winding surface (7a) for winding the shifter cable (Ca);

an elongated connecting member (6) having a first end region and a second end region, the first end region being fixed to the winding member (7) generally perpendicular to a plane of the winding surface (7a);

a partition member (2c) disposed about the connecting member (6) for positioning the connecting member (6) within the handlebar; and an operating member (5) fixed to the second end region of the connecting member (6) so that rotation of the operating member (5) causes rotation of the winding member.

2. The device according to claim 1 wherein the partition member (2c) is disposed at the first end region of the connecting member (6).

3. The device according to claim 1 further comprising a spring (8) having a first end fixed to the partition member (2c) and a second end fixed to the operating member (5).

4. The device according to claim 1 wherein the operating member (5) has a generally cylindrical side surface (5a) and an end surface (5c), wherein the end surface (5c) is fixed to the second end region of the connecting member (6).

5. The device according to claim 4 wherein the winding member (7) is generally disc shaped.

6. The device according to claim 5 wherein the connecting member (6) is directly connected to the winding member (7) and to the operating member (5).

7. The device according to claim 6 wherein the winding member (7) is generally parallel to the end surface (5c) of the operating member (5).

8. A bicycle shifter operating device for attachment to a free end of a bicycle handlebar (1) to shift a bicycle transmission with a shifter cable (Ca), the shifter operating device comprising:

a generally cylindrical main body part (2) having a first end portion and a second end portion;

an attachment part (3) fixed to the first end portion of the main body part (2) and which extends at a selected angle from the main body part (2) for fixing the main body part (2) to the free end of the handlebar (1);

a winding member (7) having a winding surface (7a) for winding the shifter cable (Ca);

a connecting member (6) having a first end region and a second end region, the first end region being fixed to the winding member (7);

a partition member (2c) disposed about the connecting member (6) for positioning the connecting member (6) within the main body part (2); and an operating member (5) disposed at the second end portion of the main body part (2) and fixed to the second end region of the connecting member (6) so that rotation of the operating member (5) causes rotation of the winding member.

9. The device according to claim 8 wherein the partition member (2c) is disposed in the first end portion of the main body part (2).

10. The device according to claim 9 wherein the partition member (2c) is integrally formed with the main body part (2).

11. The device according to claim 8 further comprising a spring (8) having a first end fixed to the partition member (2c) and a second end fixed to the operating member (5).

12. The device according to claim 8 wherein the attachment part (3) is adapted to frictionally engage the free end of the handlebar (1).

13. The device according to claim 8 wherein the main body part (2) includes an opening (2d) for receiving the cable (Ca) therethrough.

14. The device according to claim 8 wherein the selected angle is approximately 90°.

15. The device according to claim 8 wherein the operating member (5) has a generally cylindrical side surface (5a) and an end surface (5c), wherein the end surface (5c) is fixed to the second end region of the connecting member (6).

16. The device according to claim 15 wherein the cylindrical side surface (5a) of the operating member (5) is coaxially disposed over a cylindrical side surface of the main body part (2).

17. The device according to claim 15 wherein the winding member (7) is generally disc shaped.

18. The device according to claim 17 wherein the connecting member (6) is directly connected to the winding member (7) and to the operating member (5).

19. The device according to claim 18 wherein the winding member (7) is generally parallel to the end surface (5c) of the operating member (5).

20. A bicycle shifter operating device for attachment to a free end of a bicycle handlebar (1) to shift a bicycle transmission with a shifter cable (Ca), the shifter operating device comprising:

a generally cylindrical main body part (2) having a first end portion and a second end portion;

an attachment part (3) fixed to the first end portion of the main body part (2) and which extends at a selected angle from the main body part (2) for fixing the main body part (2) to the free end of the handlebar (1);

a winding member (7) disposed within the main body part (2), the winding member (7) having a winding surface (7a) for winding the shifter cable (Ca);

wherein the main body part (2) includes an opening (2d) for receiving the cable (Ca) therethrough;

a connecting member (6) having a first end region and a second end region, the first end region being fixed to the winding member (7);

a partition member (2c) disposed about the connecting member (6) for positioning the connecting member (6) within the main body part (2);

an operating member (5) disposed at the second end portion of the main body part (2) and fixed to the second end region of the connecting member (6) so that rotation of the operating member (5) causes rotation of the winding member; and a spring (8) having a first end fixed to the partition member (2c) had a second end fixed to the operating member (5).

\* \* \* \* \*